United States Patent
Martin

[15] 3,683,752
[45] Aug. 15, 1972

[54] MULTIPOSITION FLUID-OPERABLE PISTON AND CYLINDER UNIT

[72] Inventor: Anthony Eugene Joseph Martin, 11 The Glade, Birmingham, England

[22] Filed: Sept. 17, 1970

[21] Appl. No.: 73,063

[52] U.S. Cl. .................................92/13.51, 92/175
[51] Int. Cl. .............................................F01b 9/02
[58] Field of Search....92/13.51, 13.5, 13, 13.3, 13.4, 92/13.41, 13.8, 13.6, 175

[56] References Cited

UNITED STATES PATENTS

| | | |
|---|---|---|
| 3,438,425 | 4/1969 | Butkevich et al............92/13.1 |
| 3,232,182 | 2/1966 | Gilbert .....................92/13.41 |
| 2,703,557 | 3/1955 | Polki .........................92/128 |
| 3,175,473 | 3/1965 | Boteler et al. ..............92/13.8 |
| 996,680 | 7/1911 | Schiller......................92/175 |

Primary Examiner—Martin P. Schwadron
Assistant Examiner—Clemens Schimikowski
Attorney—Holman & Stern

[57] ABSTRACT

A multiposition piston/cylinder unit includes a pair of pistons slidable in a cylinder. One piston has the ends of its stroke determined by interacting adjustable abutments thereon and in the cylinder. The other piston has an adjustable abutment for abutting the first piston. The output of the unit taken from the second piston by a rod.

6 Claims, 1 Drawing Figure

PATENTED AUG 15 1972 3,683,752
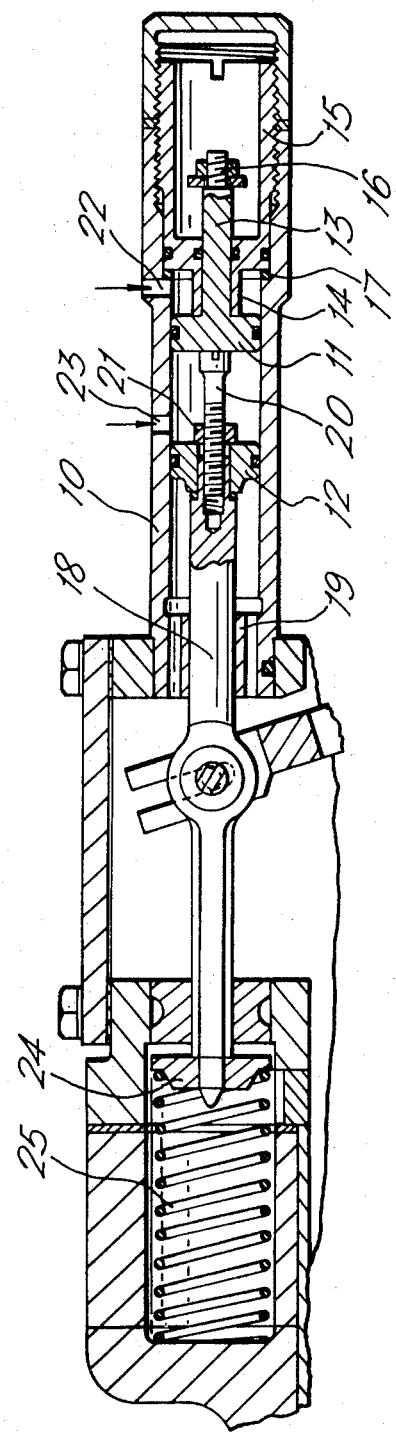
INVENTOR
Anthony Eugene Joseph Martin
BY Holman & Stern
ATTORNEYS

MULTIPOSITION FLUID-OPERABLE PISTON AND CYLINDER UNIT

This invention relates to a multiposition fluid-operable piston and cylinder unit.

A unit in accordance with the invention comprises a cylinder, first and second pistons slidable in the cylinder, means defining first and second limiting positions of the first piston, means defining a limiting position for the second piston at one end of its stroke and abutment means whereby the position of the second piston at the other end of its stroke is determined by the position of the first piston.

An example of the invention is shown in section in the accompanying drawings.

The piston and cylinder unit shown in the drawings forms part of the hydrostatic transmission system described in co-pending applications Nos. 17534/69 and 17537/69.

The unit includes a cylinder 10 in which first and second pistons 11 and 12 respectively are slidably mounted. The two pistons 11 and 12 are of the same diameter. The first piston 11 has an integral stem 13 which slidably engages in a sleeve 14 on a cup-shaped member 15 screw-threadedly engaged in the end of the cylinder 10. A stop 16 is fitted on to the end of the cylinder end of the stem so that engagement between the stop 16 and the interior of the cup-shaped member 15 limits movement of the piston 11 in one direction and engagement between the piston 11 and the sleeve 14 limits movement of the piston 11 in the opposite direction. There are therefore defined first and second limiting positions of the first piston.

To adjust these limiting positions shims 17 may be interposed between the end of the cup-shaped member 15 and a shoulder in the interior of the cylinder and shims may also be employed to adjust the piston of the stop 16 on the stem 13.

The second piston 12 has a piston rod 18 attached to it and it is from this piston rod 18 that the output movement of the unit is taken. A guide portion 19 at one end of the cylinder 10 slidably receives the piston rod 18 and is engageable by the piston 12 to limit movement thereof in one direction. The opposite limit of the movement of the piston 12 is determined by an adjustable abutment means 20 which is engageable with the piston 11. The abutment means 20 is in the form of a screw which engages a tapped bore in the piston rod 18, a locknut 21 being provided for locking the abutment means 20 in any desired position.

The unit is single acting and has a pair of inlets 22, 23 for pressurized fluid. Inlet 22 opens into the cylinder on the side of the piston 11 remote from the piston 12. The inlet 23 opens into the cylinder between the pistons. The piston rod 18 has at its free end a disc 24 against which a compression spring 25 abuts. This spring serves to urge the rod 18 to the right as seen in the drawing. Thus the two pistons 11 and 12 are urged to the position shown with the abutment means 20 engaging the piston 11 and thrusting it against the sleeve portion 14.

If pressurized fluid is supplied to the inlet 22 the piston 11 is moved to the left, displacing the piston 12 and the piston rod 18, until the stop 16 engages the cup-shaped member 15, thereby arresting the piston rod 18 in an intermediate position. When pressurized fluid is supplied to the inlet 23 the piston 12 is moved up to the guide portion 19.

Having thus described my invention what I claim as new and desire to secure by Letters Patent is:

1. A multiposition fluid-operable piston and cylinder unit comprising a cylinder, first and second piston means slidable in said cylinder, means defining a first limiting position at one end of the stroke of said first piston means, means defining a second limiting position at the other end of the stroke of said first piston means, means defining a first limiting position at one end of the stroke of said second piston means and adjustable abutment means operatively engaged between said first and second piston means whereby the position of said second piston means at the other end of its stroke is determined by the position of said first piston means.

2. A unit as claimed in claim 1 comprising a sleeve fitted in said cylinder, said first piston means having a stem slidable in said sleeve, said stem having a portion extending beyond said sleeve with a stop fitted on said portion, said sleeve and said stop constituting, respectively, said means defining said first and said second limiting position of said first piston means.

3. A unit as claimed in claim 2 in which said sleeve is axially adjustable in said cylinder.

4. A unit as claimed in claim 2 in which said stop is adjustably mounted on said portion of said stem.

5. A unit as claimed in claim 1 comprising guide means carried by said cylinder, said second piston means having a piston rod slidable in said guide means, a portion of said guide means engaging a portion of said second piston means and constituting said means defining a first limiting position of said second piston means.

6. A unit as claimed in claim 5 in which said abutment means comprises a screw threadably carried by said second piston means and having a portion engagable with a portion of said first piston means.

* * * * *